R. E. FERRIS.
SYSTEM OF CONTROL.
APPLICATION FILED APR. 23, 1920.

1,365,585.

Patented Jan. 11, 1921.

WITNESSES:
R. J. Fitzgerald
W. R. Coley

INVENTOR
Ralph E. Ferris.
BY
ATTORNEY

UNITED STATES PATENT OFFICE.

RALPH E. FERRIS, OF EDGEWOOD PARK, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,365,585.  Specification of Letters Patent.  Patented Jan. 11, 1921.

Original application filed July 19, 1917, Serial No. 181,537. Divided and this application filed April 23, 1920. Serial No. 375,917.

*To all whom it may concern:*

Be it known that I, RALPH E. FERRIS, a citizen of the United States, and a resident of Edgewood Park, in the county of Allegheny, and State of Pennsylvania, have invented a new and useful Improvement in Systems of Control, of which the following is a specification, this application being a division of my copending application, Serial No. 181,537, filed July 19, 1917.

My invention relates to systems of control for dynamo-electric machines and especially to the excitation and control of electric railway motors and the like during regenerative operation.

One object of my invention is to provide a novel type of auxiliary generator that is mechanically coupled to rotate with the main momentum-driven machines for exciting the main field windings during the regenerative period and for governing an auxiliary motor.

Other minor objects of my invention will become evident from the following description taken in conjunction with the accompanying drawings, wherein—

Figure 1:
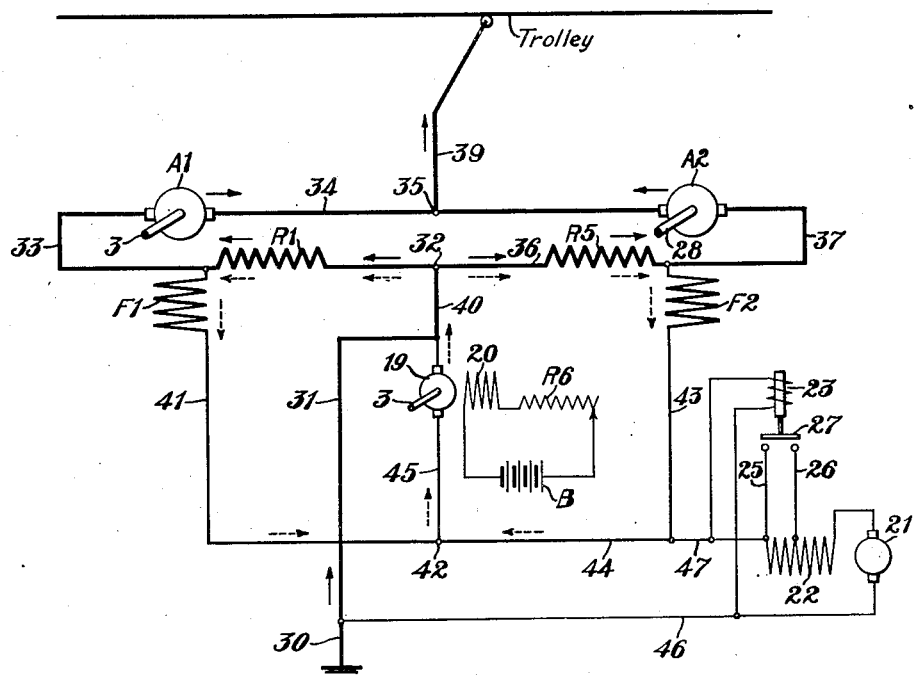
Figure 2:
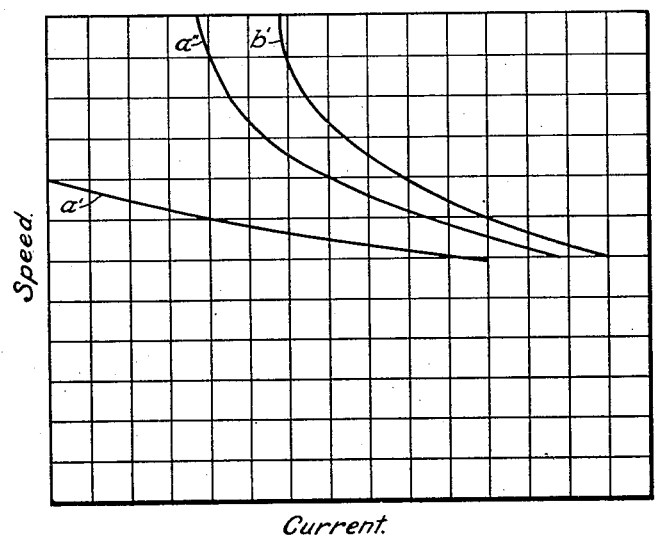

Figure 1 is a diagrammatic view of the essential circuits of a system of control embodying my invention; and Fig. 2 is a curve chart serving to represent certain operating characteristics of the main machine of Fig. 1 during regenerative operation.

Referring to Fig. 1 of the drawings, the system shown comprises supply-circuit conductors Trolley and Ground; a plurality of main dynamo-electric machines respectively having commutator-type armatures A1 and A2 and field windings F1 and F2 of the series type; a plurality of stabilizing resistors R1 and R5 that are associated with the main-machine circuits in a manner to be described; an auxiliary generating armature 19 that may be adapted to rotate with the main armature A1 by reason of being mounted upon, or driven from, the main-armature shaft or the truck axle, such as 3; a source of substantially constant voltage, such as a storage battery B, for exciting purposes to be set forth; an auxiliary motor having an armature 21 and a series-related plural-section field winding 22 for driving the familiar auxiliary mechanical loads upon a locomotive, such as an air-compressor or a blower for the main machine; and a relay device 23 that is controlled by the voltage of the axle-driven generator 19 for the purpose of excluding from circuit one of the sections of the field winding 22, under predetermined conditions to be set forth.

The axle-driven generator armature 19 is provided with a field winding 20 that is subject to substantially constant excitation from the battery B, for example, through a resistor R6. The auxiliary armature 19 may be mounted upon the armature or truck axle 3, corresponding to the main armature A1, or upon the shaft 28 that is associated with the other main armature A2, the particular type of driving mechanism for the auxiliary generator armature being, of course, immaterial to my present invention, the only requisite being that the auxiliary armature rotates at the same speed as, or at a speed proportional to, the main-machine speed.

The field winding 22 for the auxiliary motor 21 is provided with a terminal tap 25 and an intermedate tap 26 which are bridged by a movable contact disk 27 of the voltage-relay device 23 in its lower position, as subsequently set forth in detail.

Assuming that the various machines are normally operating during the regenerative period, the main circuits are established from the supply-circuit conductor Ground through conductors 30 and 31 to junction-point 32, where the circuit divides, one branch including stabilizing resistor R1, conductor 33, main armature A1 and conductor 34 to a second junction-point 35 and the other branch traversing conductor 36, stabilizing resistor R5, conductor 37, main armature A2 and conductor 38 to the junction-point 35, whence a common circuit is completed through conductor 39 to the Trolley.

The main exciting circuit is established from the positive terminal of the axle-driven generator armature 19 through conductor 40 to the junction-point 32, where the circuit divides, one branch traversing resistor R1, main field winding F1 and conductor 41 to another junction-point 42, and the other branch including conductor 36, resistor R5, main field winding F2 and conductors 43 and 44 to the junction-point 42, whence a common circuit is completed through conductor 45 to the negative terminal of the axle-driven generator armature 19.

An auxiliary circuit is established from the positive terminal of the axle-driven armature through conductors 31 and 46, armature 21 of the auxiliary motor, the entire series-related field winding 22 thereof and conductors 47, 44 and 45, to the negative terminal of the armature 19.

To compensate for the gradual decrease of vehicle speed during the retardation period, the resistors R1 and R5 may be gradually excluded from circuit or the active circuit value of the auxiliary resistor R6 may be gradually decreased.

The main-armature and main-field-winding connections just recited are not of my present invention, but are fully set forth and claimed in a patent granted to R. E. Hellmund and myself, No. 1,298,943, issued April 1, 1919, and assigned to the Westinghouse Electric & Manufacturing Company.

The present system is inherently self-regulating and very stable in its regenerative operation, as will be evident from the following discussion. As indicated by the solid arrows, representing regenerated current, and the dotted arrows, denoting main exciting current, both of these currents traverse the stabilizing resistor R1 in the same direction. Consequently, upon an incipient increase of regenerated current in the main armature A1, the correspondingly increased voltage drop across the resistor R1 immediately and inherently reduces the voltage available for delivery to the main field winding F1 from the auxiliary generator armature 19. The converse action takes place in the event of an incipient decrease of regenerated current. In this way, a substantially constant current is returned to the supply circuit, irrespective of voltage fluctuations thereof, and the like.

By employing different ranges of exciting currents for the auxiliary field winding 20, a series of speed-current curves for the main machines, corresponding to the curves $a'$, $a''$ and $b'$ shown in Fig. 2, and more fully treated in my above-identified parent application, may be obtained. The entire combination, while affording desirable regenerative operation, is very simple and inherently stable.

If, at any time during regeneration or otherwise, the voltage of the axle-driven armature 19 decreases to a predetermined value, the correspondingly reduced energization of the relay device 23 allows the device to assume its lower or circuit-closing position, whereby one section of the series-related field winding 22 for the auxiliary motor armature 21 is short-circuited or excluded from circuit. Such action automatically produces an increased speed of the auxiliary motor, in accordance with familiar principles, and thus, the air-compressor, blower or other mechanical load that is attached to the auxiliary motor may continue to be utilized to its full capacity.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. The combination with a supply circuit and a main dynamo-electric machine adapted to return energy thereto and having an armature and a field winding, of an auxiliary machine armature rotatable with the main armature for exciting said field winding, a field winding for said auxiliary armature, an auxiliary motor fed from said auxiliary armature, and means dependent upon auxiliary-armature conditions for varying the excitation of said motor.

2. The combination with a supply circuit and a main dynamo-electric machine adapted to return energy thereto and having an armature and a field winding, of an auxiliary machine armature rotatable with the main armature for exciting the main field winding, a field winding for said auxiliary armature, a battery for energizing the auxiliary field winding, an auxiliary motor fed from said auxiliary armature and having a plural-section field winding, and means for excluding one section from circuit under relatively low-voltage conditions of said auxiliary armature.

3. In a system of control, the combination with a supply circuit and a main dynamo-electric machine having an armature and a field winding, of a resistor connected in series relation with said armature across the supply circuit, an auxiliary machine armature rotatable with the main armature and connected through the main field winding across said resistor, a field winding for said auxiliary armature, a battery for energizing the auxiliary field winding, an auxiliary motor fed from said auxiliary armature and having a plural-section field winding, and a relay device connected across said auxiliary armature for excluding one section from circuit under relatively low-speed conditions of the main machine.

4. The combination with a main machine having an armature and a field winding, of an auxiliary-machine armature rotatable with the main armature for exciting said field winding, a device connected to said auxiliary armature, and means responsive to certain conditions thereof for varying the energization of said device.

5. The combination with a main momentum-driven dynamo-electric machine having an armature and a field winding, of an auxiliary-machine armature rotatable with the main armature for exciting said field winding, an auxiliary motor fed from said auxiliary armature, and means responsive to the voltage conditions thereof for varying the speed of said motor.

6. The combination with a main dynamo-electric machine having an armature and a field winding, of an auxiliary-machine armature rotatable with the main armature for exciting said field winding, an auxiliary motor fed from said auxiliary armature and having a plural-section field winding, and means responsive to certain voltage conditions of said auxiliary armature for excluding one section from circuit.

7. The combination with a main momentum-driven dynamo-electric machine having an armature and a field winding, of a resistor connected in series relation with said armature, an auxiliary-machine armature rotatable with the main armature and connected through the main field winding across said resistor, an auxiliary motor connected to said auxiliary armature and having a plural-section field winding, and a relay device energized responsively to the auxiliary-armature voltage for excluding one section from circuit under certain speed conditions of the main machine.

In testimony whereof, I have hereunto subscribed my name this 12th day of April, 1920.

RALPH E. FERRIS.